United States Patent
Sharma et al.

(10) Patent No.: US 8,660,018 B2
(45) Date of Patent: Feb. 25, 2014

(54) MACHINE LEARNING APPROACH FOR ESTIMATING A NETWORK PATH PROPERTY

(75) Inventors: Puneet Sharma, Long Beach, CA (US); Rita Wouhaybi, North Bergen, NJ (US); Sujata Banerjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1625 days.

(21) Appl. No.: 11/496,409

(22) Filed: Jul. 31, 2006

(65) Prior Publication Data

US 2008/0025231 A1   Jan. 31, 2008

(51) Int. Cl.
*H04L 12/26* (2006.01)
*H04L 12/28* (2006.01)
*H04L 12/24* (2006.01)

(52) U.S. Cl.
CPC ..................... *H04L 41/12* (2013.01)
USPC ............................ 370/252; 370/254; 370/255

(58) Field of Classification Search
USPC ........................................................ 370/252
See application file for complete search history.

(56) References Cited

U.S. PATENT DOCUMENTS

| | | | | |
|---|---|---|---|---|
| 6,076,083 A | * | 6/2000 | Baker .............................. | 706/52 |
| 2002/0116154 A1 | * | 8/2002 | Nowak et al. .................. | 702/186 |
| 2005/0053009 A1 | * | 3/2005 | Denby et al. .................. | 370/250 |
| 2008/0188214 A1 | * | 8/2008 | Qi ................................. | 455/424 |

OTHER PUBLICATIONS

"Avaya ExpertNet VoIP Assessment Tool" Avaya White Paper. Sep. 2005.*
Bayes Net Toolbox for Matlab, http://bnt.sourceforge.net/, downloaded Jul. 31, 2006.
MATLAB, http://www.mathworks.com/products/matlab/, downloaded Jul. 31, 2006.
cPlanetLab, http://www.planet-lab.org/, downloaded Jul. 31, 2006.
Scriptroute, http://cs.washington.edu/research/networking/scriptroute/, downloaded Jul. 31, 2006.
Cohen, I. et al., "Correlating Instrumentation Data to System States: A Building Block for Automated Diagnosis and Control", downloaded Jul. 31, 2006.
Dabek, F. et al., "Vivaldi: A Decentralized Network Coordinate System", SIGCOMM'04, ACM Aug.-Sep. 2004.
Fonseca, R. et al., "Distributed Querying of Internet Distance Information", downloaded Jul. 31, 2006.
Francis, P. et al., "IDMaps: A Global Internet Host Distance Estimation Service", IEEE/ACM Trans. on Networking, Oct. 2001.
Gummadi, K.P. et al., "King: Estimating Latency Between Arbitrary Internet End Hosts", downloaded Jul. 31, 2006.
Lee, M. D. et al., Bayesian Statistical Inference in Psychology: Comment on Trafimow (2003), Psychological Review, vol. 112, No. 3, p. 662-668, 2005.
Ng, T.S.E. et al., "Predicting Internet Network Distance with Coordinates-Based Approaches", downloaded Jul. 31, 2006.
Padmanabhan, V.N. et al., "Server-Based Inference of Internet Link Lossiness", IEEE INFOCOM 2003.

(Continued)

*Primary Examiner* — Jason Mattis
*Assistant Examiner* — Stephen J Clawson (57) ABSTRACT

A network path property for nodes in a network is estimated using machine learning techniques. Network path property measurements for paths between nodes and a subset of node in the network are received. Using machine learning, the network path property for the nodes is estimated based on the network path property measurements.

17 Claims, 8 Drawing Sheets

---

310

CALCULATE m-CLOSEST WITH COUNTER PROFILE { // FROM i TO j

311 — OBTAIN $M_{i,up}$ & $M_{j,down}$;

312 — DETERMINE NETWORK PATH PROPERTY MEASUREMENTS $D_{i,up}$ FROM i TO $M_{i,up}$;

313 — DETERMINE NETWORK PATH PROPERTY MEASUREMENTS $D_{j,down}$ FROM $M_{j,down}$ TO j;

314 — $M_{i,j} = M_{i,up}[1..m] \cap M_{j,down}[1..m]$;

315 — $C = |M_{i,j}|$;

316 — $P_{i,j} = [D_{i,up}[1..m], D_{j,down}[1..m]];$ }

(56) References Cited

OTHER PUBLICATIONS

Pias, M. et al., "Lighthouses for Scalable Distributed Location", downloaded Jul. 31, 2006.
Ratnasamy, S. et al., "Topologically-Aware Overlay Construction and Server Selection", downloaded Jul. 31, 2006.
Srinivasan, S. et al., "M-Coop: A Scalable Infrastructure for Network Measurement", WIAPP 2003, Internet Applications, Jun. 2003.
Srinivasan, S. et al., "Network Measurement as a Cooperative Enterprise", downloaded Jul. 31, 2006.
Tang, L. et al., "Virtual Landmarks for the Internet", IMC'03, ACM 2003.
Wong, B. et al., "Meridian: A Lightweight Network Location Service Without Virtual Coordinates", SIGCOMM'05, ACM 2005.
Xu, Z. et al., "Netvigator: Scalable Network Proximity Estimation", HPL-2004-28, Hewlett Packard, Mar. 3, 2005.
Srinivasan, S. et al., "M-coop: A Scalable Infrastructure for Network Management", IEEE, 2003.

* cited by examiner

CALCULATE m-CLOSEST PROFILE { // FROM i TO j

301 — OBTAIN $M_{i,up}$ & $M_{j,down}$;
302 — DETERMINE NETWORK PATH PROPERTY MEASUREMENTS $D_{i,up}$ FROM i TO $M_{i,up}$;
303 — DETERMINE NETWORK PATH PROPERTY MEASUREMENTS $D_{j,down}$ FROM $M_{j,down}$ TO j;
304 — $P_{i,j} = [D_{i,up}[1..m], D_{j,down}[1..m]];$ }

CALCULATE m-CLOSEST WITH COUNTER PROFILE { // FROM i TO j

311 — OBTAIN $M_{i,up}$ & $M_{j,down}$;
312 — DETERMINE NETWORK PATH PROPERTY MEASUREMENTS $D_{i,up}$ FROM i TO $M_{i,up}$;
313 — DETERMINE NETWORK PATH PROPERTY MEASUREMENTS $D_{j,down}$ FROM $M_{j,down}$ TO j;
314 — $M_{i,j} = M_{i,up}[1..m] \cap M_{j,down}[1..m];$
315 — $C = |M_{i,j}|;$
316 — $P_{i,j} = [D_{i,up}[1..m], D_{j,down}[1..m]];$ }

CALCULATE NODE HISTOGRAM PROFILE { // FROM i TO j

- 321 — OBTAIN $M_{i,up}$ & $M_{j,down}$;
- 322 — DETERMINE NETWORK PATH PROPERTY MEASUREMENTS $D_{i,up}$ FROM i TO $M_{i,up}$;
- 323 — DETERMINE NETWORK PATH PROPERTY MEASUREMENTS $D_{j,down}$ FROM $M_{j,down}$ TO j;
- 324 — MAP $D_{i,up}$ TO A HISTOGRAM $H_{i,up}$;
- 325 — MAP $D_{j,down}$ TO A HISTOGRAM $H_{j,down}$;
- 326 — $P_{i,j} = [H_{i,up}, H_{j,down}]$; }

CALCULATE MILESTONE HISTOGRAM PROFILE { // FROM i TO j

- 331 — OBTAIN $M_{i,up}$ & $M_{j,down}$;
- 332 — $M_{i,j} = M_{i,up} \cap M_{j,down}$
- 333 — $P_{i,j} = \Phi$
- 340 — FOR EVERY ms $\in M_{i,j}$
  - 341 — OBTAIN $I_{ms,up}$ (NODES THAT PASS ms ON UPLINK);
  - 342 — DETERMINE NETWORK PATH PROPERTY MEASUREMENTS $D_{ms,up}$ FROM $I_{ms,up}$ TO ms;
  - 341 — OBTAIN $I_{ms,down}$ (NODES THAT PASS ms ON DOWNLINK);
  - 342 — DETERMINE NETWORK PATH PROPERTY MEASUREMENTS $D_{ms,down}$ FROM ms TO $I_{ms,down}$;
  - 343 — MAP $D_{ms,up}$ TO A HISTOGRAM $H_{ms,up}$;
  - 344 — MAP $D_{ms,down}$ TO A HISTOGRAM $H_{ms,down}$;
  - 345 — $P_{i,j} = [P_{i,j} ; H_{ms,up}, H_{ms,down}]$;

MACHINE LEARNING APPROACH FOR ESTIMATING A NETWORK PATH PROPERTY

BACKGROUND

A number of emerging, popular applications benefit from connecting to nodes in a network that meet certain criteria, instead of choosing a random set of server nodes in the network. For example, a streaming media client would benefit by connecting to a media server that is lightly loaded and has high downstream available bandwidth and low latency. More sophisticated applications and services may use dynamic service composition in which the problem entails identifying necessary service components matching required Quality of Service (QoS) criteria.

Finding the node or subset of nodes that meet some criteria of network metrics using an exhaustive search could translate to every node conducting measurements to every other node in the network. This approach is, at best, not scalable due to the extensive number of required measurements. Furthermore, existing systems do not include time when determining network metrics and instead force nodes into repeating their measurements continuously in order to adapt to network changes.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments of the invention. Moreover, in the following detailed description, references are made to the accompanying figures, which illustrate specific embodiments. Electrical, mechanical, logical and structural changes may be made to the embodiments without departing from the spirit and scope of the embodiments of the invention.

According to an embodiment, machine learning is used to determine network path properties, such as network hops, latency, bandwidth, loss, etc. The determined network path property may be used as a distance estimation between nodes, which is defined in terms of the network path property. A node is any device that may send and/or receive messages from another device via the network. A network path property may be estimated by measuring the network path property to other nodes in the network, referred to as milestone nodes. The measurements are used to create a node profile for each of the nodes. The network path property may be estimated by inputting the profiles into a machine learning tool, such as a classifier, neural network, or other known machine learning tool.

The milestone nodes are comprised of intermediate routers and landmark nodes. In one embodiment, any node in the network may serve as a landmark node, as long as the set of landmark nodes chosen are geographically dispersed. Also, nodes that are chosen as landmark nodes may be nodes that have little down time and that are likely to stay connected to the network, such that the landmark nodes can perform measurements as needed. The number of nodes selected to be landmark nodes is generally much smaller than the total number of nodes in the network. All nodes in the network may measure network path properties to the landmark nodes, for example, using trace route or another measurement tool. Nodes encountered more than once on the path to or from landmark nodes may also be used as milestone nodes, and are referred to as intermediate routers. For example, routers encountered by a message from a node en route to a landmark node are referred to as intermediate routers. Measurements of the network path properties to the intermediate routers may also be performed to determine the node profiles.

In one embodiment, a node measures a network path property between each landmark node and the node and also measures the network path property between the intermediate routers for the landmark nodes and the node to determine a network path property vector for the node. The measurements in the network path property vector may include network path property measurements from the node to milestone nodes, referred to as upstream measurements. The measurements from the milestone nodes to the node are referred to as downstream measurements. Network path property vectors are used to determine the node profiles.

In one embodiment, nodes conduct traceroute measurements to every landmark node, discovering upstream routes from each node to the landmark nodes. Also, every landmark node conducts traceroute measurements to the nodes, discovering downstream routes from the landmark nodes to the nodes. As a result, whenever a router appears on at least one upstream and one downstream route, it is considered a milestone. In addition, all landmark nodes and all intermediate routers are considered milestone nodes. Thus, after collecting all of the measurements, the network discovers all the milestone nodes, including the intermediate routers.

The measurements of a network property to intermediate routers can be mostly obtained with little or no added messaging overhead if the intermediate routers can respond to measurement traffic, such as probe packets for measuring round-trip-time. That is additional measurement traffic to the intermediate routers need not be generated, because a probe packet being transmitted to a landmark node encounters intermediate routers en route to the landmark node. Network path property vectors including the measurements may be generated for substantially all the nodes in the network.

The measurements in a network path property vector are used to create a node profile for a node, and a node profile may be created for each of the nodes. The node profiles, in addition to measurements for one or more network path properties, may include a timestamp for the measurements, such as a time of day. Including the timestamps in the profile captures the periodic variations in network path property and hence estimates network path property for a particular time of the day. The timestamps may also be used to determine whether the profiles need to be updated. The node profiles may be used to estimate the network path property for network paths other than uplink and downstream routes using machine learning. For example, the number of hops between two nodes may be estimated without actually measuring the number of hops between the two nodes. Network path property estimations may be used for a variety of applications, such as finding a closest node. In turn, finding a closest node may be used to identify a node for routing in the network. In another example, finding a closest node may be used to find a closest node providing desired content or services for a user while maintaining one or more network metrics at predetermined levels.

The techniques according to embodiments described herein can accurately estimate a network path property by measuring the network path property to a relatively small number of nodes. This way of network path property inference is highly scalable and does not require the large amount of measurements typically needed for determining the network path property.

Figure 1:
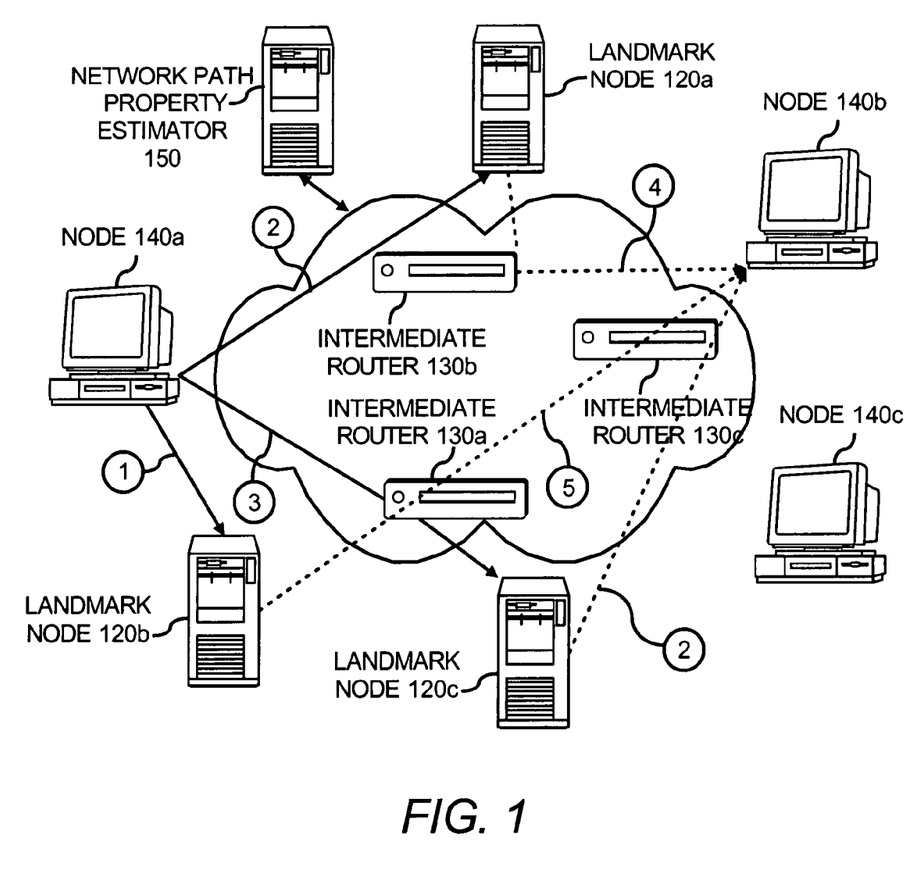
FIG. 1 illustrates a system, according to an embodiment.

FIG. 1 illustrates a system 100 including nodes and milestone nodes that may be connected via a network 110. The milestone nodes include landmark nodes 120a-c and intermediate routers 130a-c. Nodes 140a-c measure a network path property to the milestone nodes. A network path property estimator 150 estimates the network path property based on the measurements to the milestone nodes. The network path property estimator 150 may be included in a node connected to the network 110. In one embodiment, the network path property estimator 150 is operable to receive and respond to queries for determining a network path property. In one example, a request may include a request for a network path property. The network path property estimator 150 may respond to a request with an estimation of the network path property, which may be used as a distance estimation between nodes.

The number of milestone nodes and other nodes shown in FIG. 1 are provided by way of example and not limitation. The number of landmark nodes, intermediate routers and other nodes may not be equal. Typically, there may be a much larger number of other nodes that measure a network path property to a smaller number of landmark nodes and intermediate routers. Also, the system 100 may include more than one network path property estimator 150 to respond to queries from nodes in different regions of the network. In other embodiments, network path property estimators may be included in milestone nodes or other nodes.

Also shown in FIG. 1 are hop counts between nodes and milestone nodes. For example, the hop counts measured from node 140a to landmark nodes 120a-c are 2, 1 and 3 hops, respectively. The hop counts measured from the landmark nodes 120a-c to the node 140b are 4, 5, and 2 hops, respectively. The hop counts may be used as distances between nodes. The hop counts may be measured by the nodes 140a and 140b and/or the landmark nodes 120a-c. Also, measured may be performed for multiple network path properties, and estimations may be determined for one or more the path properties.

The network path property measurements may be used to infer the topology of the network 110, which includes the nodes connected to the network. To estimate a network path property, which can be used to infer the topology, profiles for the nodes 140a-c are determined from measurements for the network path property to the milestone nodes. One characteristic of the profiles is they can be anonymous making the system 100 more scalable, as network path property estimation uses a subset of nodes to generalize behavior and detect similar behavior among, otherwise, totally different nodes. The estimation from the profiles uses machine learning technology to estimate the network path property. Bayesian Networks are one type of machine learning technology that may be used.

The machine learning technology performs learning-based prediction to build a network path estimation system that can learn from the profiles of nodes and, eventually, achieve a degree of expertise where changes in the network path properties of existing nodes can be predicted. Such a prediction system is operable to provide nodes with better predictions of changes in network path properties and can achieve this goal in a scalable fashion.

Figure 2:
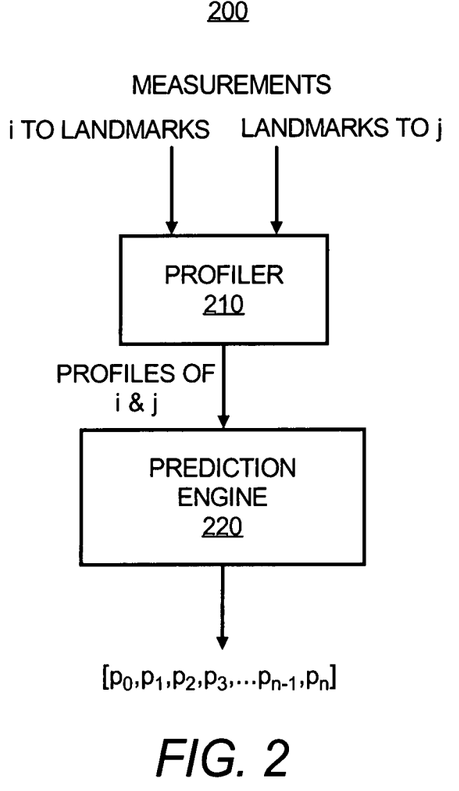
FIG. 2 illustrates a network path property estimation system, according to an embodiment.

FIG. 2 shows the two basic components of a network path property estimation system 200. The system 200 includes a profiler 210 and a learning-based prediction engine 220 to estimate network path properties.

The profiler 210 creates the profiles for nodes based on the measurements for a network path property to the milestone nodes. The profiles capture the characteristics of the nodes, as well as the topological relationship between different nodes in the network. For example, the system 200 estimates a network path property for a path between nodes i and j based on measurements for the network property for nodes i and j. Examples of the nodes i and j are two nodes of the nodes 140a-c shown in FIG. 1. The input of the profiler 210 is the measurements from the node i to the landmark nodes, such as the landmark nodes 120a-c shown in FIG. 1, and the measurements from the landmark nodes to the node j. Measurements may also include measurements between each of the nodes i and j and intermediate routers.

The profiler 210 determines the profiles of the nodes i and j based on the measurements. Different embodiments of functions for determining the profiles are described in further detail below.

The profiles generated by the profiler 210 are used as input to the prediction engine 220. Initially, the prediction engine 220 undergoes a training period where a subset of true values of the network path property of interest, such as hop count or other network path property, are provided to the prediction engine 220. Training procedures for generating a prediction engine, such as a Bayesian classifier or another type of classifier, are well known in the art. The trained prediction engine 220 then takes node profiles as input to provide a final estimate for the network path property, which may be used as the distance estimation between the nodes.

In the example shown in FIG. 2, the output of the prediction engine 220 is a vector comprised of probabilities $[p_0, p_1, p_2, p_3, \ldots, p_{n-1}, p_n]$ representing the probability distribution for the different classes. The classes in this example are the number of hops between the nodes i and j. The probabilities are the probability that a respective number of hops is true. The probabilities are probabilities for possible estimations for the network path property. For example the maximum number of hops in a network, such as the network 110 shown in FIG. 1, is 32, and thus n=32. $p_0$ represents the probability that the node i is 0 hops from the node j. $p_1$ represents the probability that the node i is 1 hop from the node j and so on including the probability that the node i is 31 hops from the node j. Each of the hop counts 0-31 are possible estimations and one may be selected based on its probability. For example, a hop count having a highest probability that it is true may be selected as the estimated network path property. Instead of hop count, other network path properties may be estimated.

The system 200 including the node profiler 210 and the prediction engine 220 may be provided in the network path property estimator 150 shown in FIG. 1. For example, the network path property estimator 150 receives a query from the node 140a requesting the closest node providing a desired service. The network path property estimator 150 determines that the nodes 140b-c provide the desired service and estimates the network path property to each of the nodes 140b-c using the profiler 210 and the prediction engine 220. The network path property estimator 150 identifies a node of the nodes 140b-c that is closest to the node 140a. The network path property estimator 150 may receive and respond to queries for the network path property using the profiler 210 and the prediction engine 220.

Figure 3A:
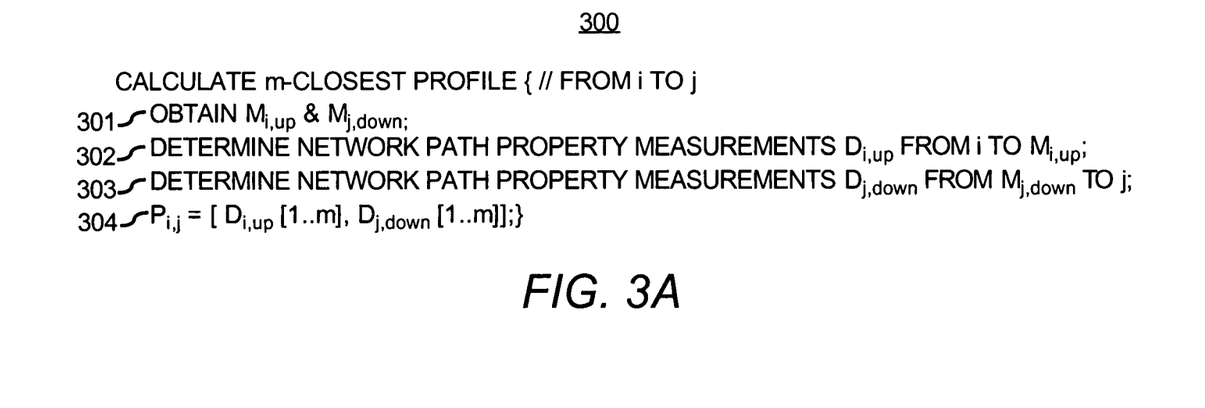
FIGS. 3A-D illustrate pseudo code for several embodiments of profile functions.

The profiler 210 shown in FIG. 2 uses a profile function to determine profiles for nodes. One embodiment of a profile function is the m-closest profile function. The pseudo code 300 for the m-closest profile function is shown in FIG. 3A. The pseudo code 300 shows pseudo code for determining the profile for estimating a network path property for a path from the node i to the node j.

Using hop count as the network path property, in order to estimate the number of hops from node i to node j using the m-closest profile function, the node i starts with a set of milestone nodes that it encounters when running traceroute measurements to the landmark nodes. This set includes the landmark nodes themselves and intermediate routers. This set of milestones is referred to as $M_{i,up}$. Similarly, $M_{j,down}$ is obtained, which is the set of milestone nodes from the landmark nodes to the node j, including the landmark nodes and intermediate routers. Obtaining $M_{i,up}$ and $M_{j,down}$ is shown in line 301 of the pseudo code 300 shown in FIG. 3A.

In lines 302 and 303, network path property vectors $D_{i,up}$ and $D_{j,down}$ are calculated. For example, the profiler 210 shown in FIG. 2 builds the vector $D_{i,up}$, that contains the measurements from the node i to every milestone node in the set of milestone nodes for the node i. Similarly, the profiler 210 builds the network path property vector $D_{j,down}$, that contains the measurements from the milestone nodes in the set for the node j to the node. In one embodiment, the set of nodes for the nodes i and j include common milestone nodes.

At line 304 of the pseudo code 300 shown in FIG. 3A, the profiler 210 determines the profile $P_{i,j}$ for estimating the network path property. For example, the profiler 210 sorts $D_{i,up}$ in ascending order, and truncates the first m values. These first m-values truncated from $D_{i,up}$ are used in the profile and include the measurements to the m-closest milestone nodes. Similarly, the profiler 210 sorts $D_{j,down}$ in ascending order, and truncates the first m values. These first m-values truncated from $D_{j,down}$ are used in the profile and include the measurements to the m-closest milestone nodes for the down link routes. The resulting network path property vectors used in the profile $P_{i,j}$ are input into the prediction engine 220 to estimate the network path property, such as hop count, between the nodes i and j.

An example of applying the m-closest function for estimating a network path property between the nodes 140a-b shown in FIG. 2 is as follows. Assume the hop count between the nodes 140a-b needs to be determined. Inspecting traceroute measurements from the node 140a to the three landmarks nodes 120a-c reveals that two milestone nodes were discovered along the upstream routes, namely intermediate routers 130a-b, with hop counts from the node 120a of 3 and 2 hops, respectively. These hop counts are shown in FIG. 1. Similarly, analyzing the traceroute measurements on the downstream routes from the landmark nodes 120a-c to the node 140b, reveals that three milestone nodes were encountered. The three milestone nodes are intermediate routers 130a-c with hop counts of 5, 4 and 2 hops, respectively. These hop counts are also shown in FIG. 1.

Applying the m-closest function with m=2, the following vectors including the truncated m-values representing the hop counts to the 2-closest milestone nodes for each node 140a and 140b are determined: node 140a: [2,3]; and node 140b: [2,4]. Thus, the input to the prediction engine 220 becomes the concatenation of these 2 profiles: [2, 3, 2, 4].

Figure 3B:
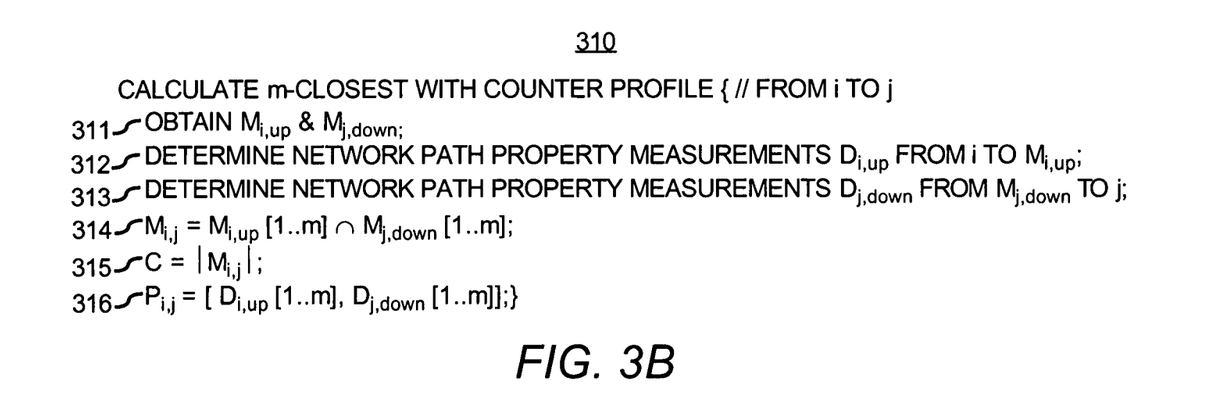

Another embodiment of a profile function used by the profiler 210 is the m-closest with counter profile function. The pseudo code 310 for the m-closest with counter profile function is shown in FIG. 3B. The pseudo code 310 shows pseudo code for determining the profile for estimating the network path property for a path from the node i to the node j.

Lines 311-313 are the same as lines 301-303 shown in FIG. 3A. At lines 314 and 315, common milestone nodes for $D_{i,up}$ and $D_{j,down}$ are determined and a count C of the common intermediate routers is determined. Referring to the example described above for estimating the hop count between the nodes 140a-b shown in FIG. 2, C=1 because intermediate milestone 130b is the only common intermediate router for $D_{i,up}$ and $D_{j,down}$.

The profile determined at the line 315 is the same as the profile determined at line 304 shown in FIG. 3A except a value of C is also included. For example, the profile includes [2, 3, 2, 4, 1] because C=1 in the example above.

Figure 3C:
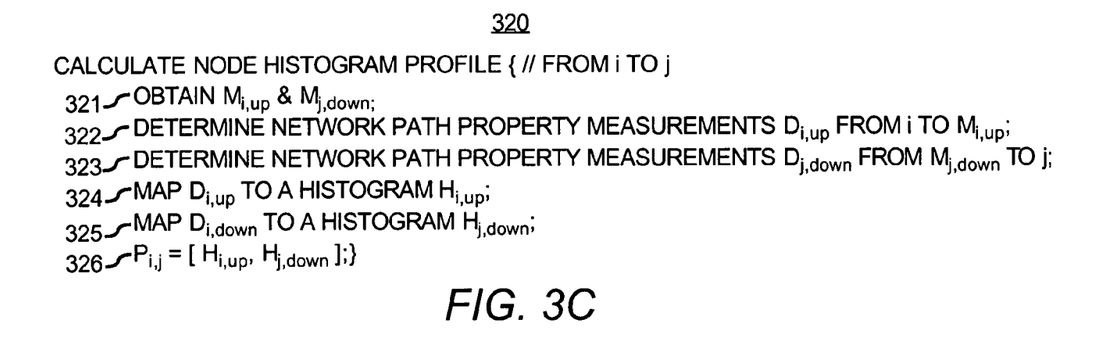

Another embodiment of a profile function used by the profiler 210 is the node histogram profile function. The pseudo code 320 for the node histogram profile function is shown in FIG. 3C. The pseudo code 320 shows pseudo code for determining the profile for estimating the network path property for a path from the node i to the node j.

Lines 321-323 are the same as lines 301-303 and lines 311-313 shown in FIGS. 3A-B, respectively. However, at lines 324 and 325, the profiler 210 determines node histograms for the nodes i and j from $D_{i,up}$ and $D_{j,down}$. The node histogram profile function is designed to retain topological information about the position of nodes with respect to all milestone nodes encountered with traceroute measurements. For example, when conducting measurements to landmark nodes, the node i encounters a set of milestone nodes. The measurements to these milestone nodes is represented as $D_{i,up}$, such as described above. The profiler 210 converts $D_{i,up}$ into a histogram referred to as $H_{i,up}$.

As an example, assume a node i measures number of hops to the milestone nodes and the hop counts are incorporated into the vector $D_{i,up}$=[2,2,3,5,6,6,6,8,10]. $D_{i,up}$ is mapped into a node histogram. For example, $D_{i,up}$ is mapped into a 32-dimension histogram, where each dimension represents the number of hop counts in $D_{i,up}$ for a particular hop count. Continuing with the example, where $D_{i,up}$=[2,2,3,5,6,6,6,8,10], the 32-dimensional node histogram $H_{i,up}$=[0,2,1,0,1,3,0,1,0, 1,0,0 . . . ]. Note that the node histogram starts with 1 as the minimum network path property. Also, the number of dimensions is 32 by way of example and not limitation. 32 dimensions may be used if the maximum hop count in the network is 32. In this example, since $D_{i,up}$ represents that no milestone nodes are 1 hop away from node i, the first value in $H_{i,up}$ is 0. However, two milestones are each 2 hops away from node i, thus the second value in $H_{i,up}$ is 2, and so on. Similarly, a node histogram is built for the downstream route measurements from the milestone nodes to the node j, referred to as $H_{j,down}$. The input to prediction engine 220 is [$H_{i,up}$, $H_{j,down}$].

Another embodiment of a profile function used by the profiler 210 is the milestone node histogram profile function.

Figure 3D:
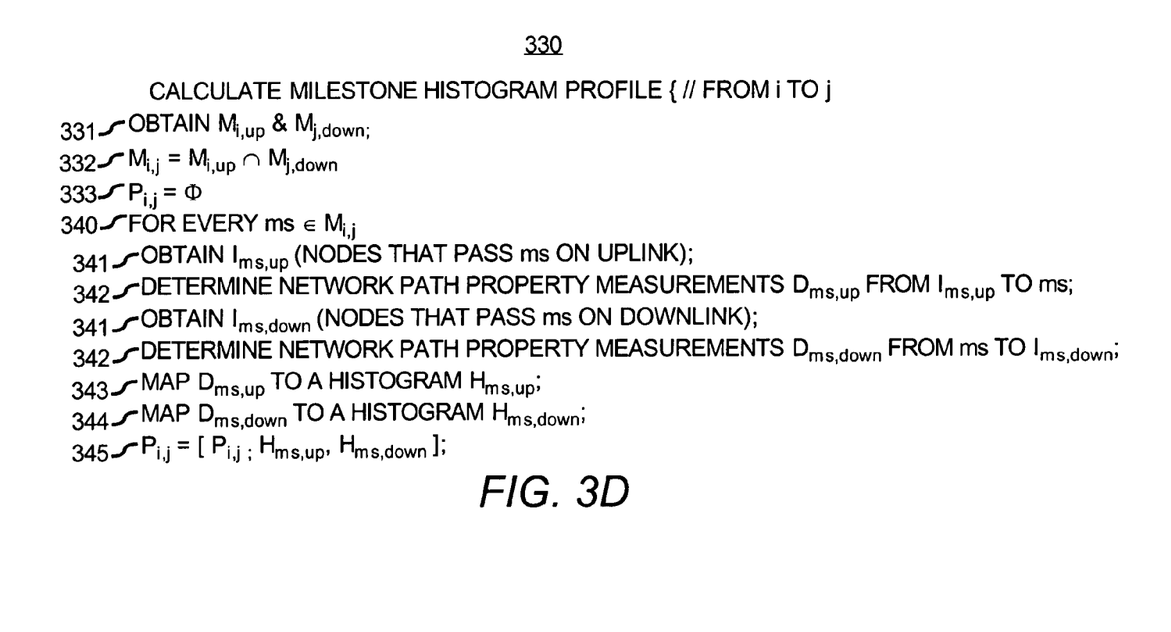

The pseudo code 330 for the milestone node histogram profile function is shown in FIG. 3D. The pseudo code 330 shows pseudo code for determining the profile for estimating the network path property for a path from the node i to the node j.

At line 331, $M_{i,up}$ and $M_{j,down}$ are determined, such as described above with respect to the other profile function embodiments. $M_{i,up}$ includes the milestone nodes in the upstream routes from node i to all the landmark nodes, and $M_{j,down}$ includes the milestone nodes in the downstream routes from all the landmark nodes to the node j.

At line 332, the common milestone nodes in $M_{i,up}$ and $M_{j,down}$ are determined. The common milestone nodes are referred to as $M_{i,j}$. At line 333, the profiler 210 determines the profile $P_{i,j}$ for every common milestone node in $M_{i,j}$. Lines 340-347 illustrate determining the profile $P_{i,j}$ for every common milestone node in $M_{i,j}$, where ms refers to all the milestone nodes in the network.

Each common milestone node in the upstream routes from node i to the milestone nodes (shown as Ims,up) is identified at line 341, and each common milestone node in the downstream routes from the landmark nodes to the node j (shown as Ims,down) is identified at line 343. Vectors $D_{ms,up}$ and $D_{ms,down}$ are determined from $I_{ms,up}$ and $I_{ms,down}$, respectively at lines 342 and 344. Then, upstream and downstream histograms $H_{ms,up}$ and $H_{ms,down}$ are determined from the vectors $D_{ms,up}$ and $D_{ms,down}$ at lines 345 and 346. The input to the prediction engine 220 is the histogram for each common milestone in the upstream and downstream routes. It should be noted that every pair of nodes, such as the pair of nodes i and j, have at least all the landmark nodes in common. Assuming the number of landmark nodes is L, the prediction engine 220 generates at least L number of outputs.

Figure 4:
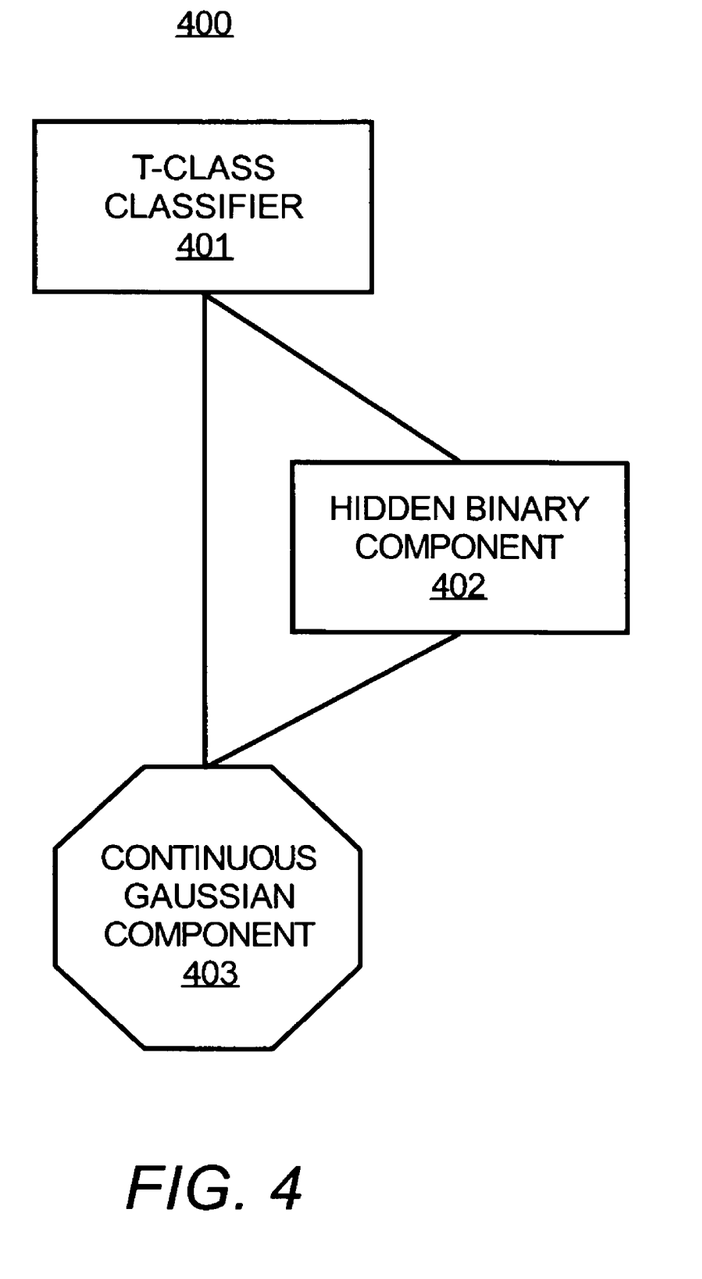
FIG. 4 illustrates a Bayesian network structure, according to an embodiment.

FIG. 4 illustrates an example of a Bayesian network structure 400 that may be used for the prediction engine 220. The structure 400 is known in the art. It will be apparent to one of ordinary skill in the art that other more complex Bayesian network structures may be used, and also other types of machine learning technology may be used for the prediction engine 220.

When describing the Bayesian network structure 400, the Bayesian network nodes are referred to as components in order to avoid confusion with the use of the word "node" to denote participating computers in the physical network. Component 403 has the profiles of the nodes as input, and is a continuous Gaussian component. The input for the component 403, for example, are the profiles determined by the profiler 210 using one of the profiling functions described above. The component 402 is a hidden binary component, and the goal of the hidden component is to capture latent relationships. The component 401 is the output component acting as a T-class classifier. Thus, the output of the Bayesian network is a T-dimensional vector representing the probability distribution of T-different classes, such as shown in the probability vector in FIG. 2. In one example, T=32 corresponding to the maximum number of hops in the network.

Figure 5:
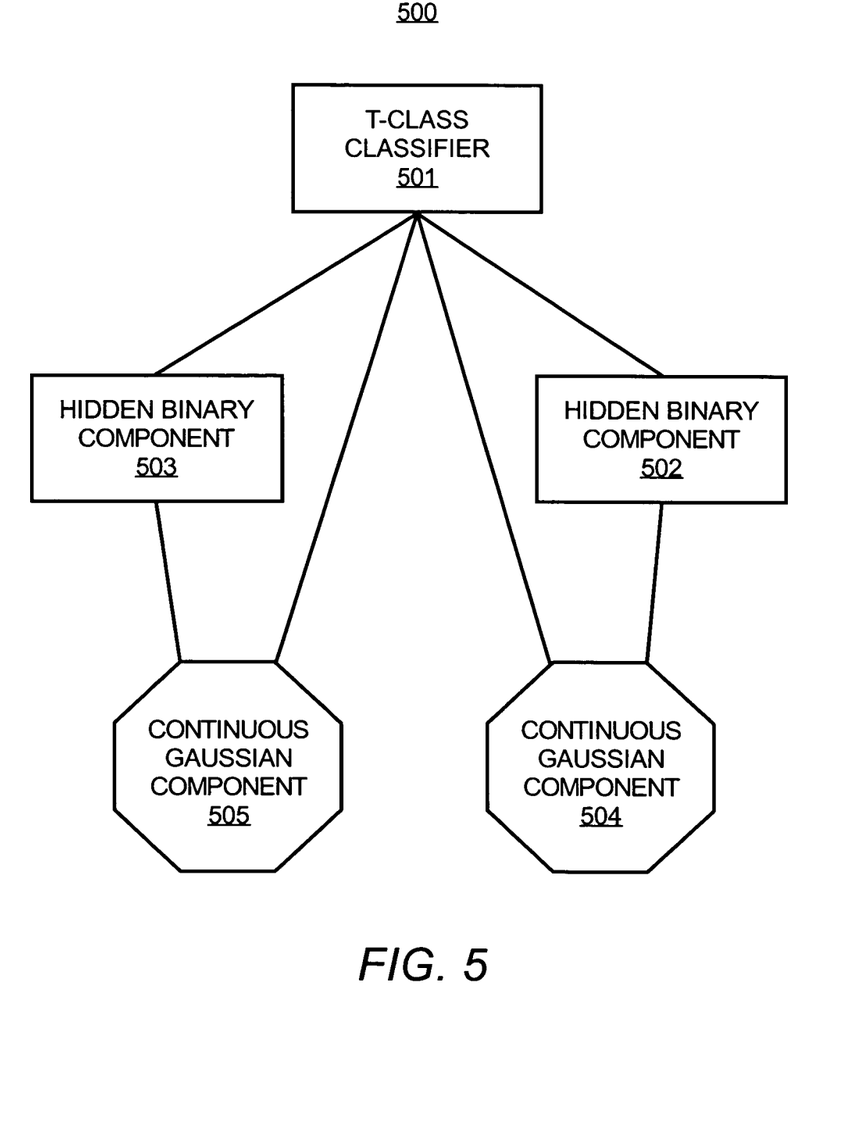
FIG. 5 illustrates a Bayesian network structure, according to another embodiment.

FIG. 5 illustrates another Bayesian network structure 500 that may be used by the prediction engine 220, according to an embodiment. The components 504 and 505 each have a profile of one of the nodes as input. For example, to estimate the network path property for a path between the nodes i and j, the profiler 210 generates a profile for the node i and a profile for the node j, such as $D_{i,up}[1 \ldots m]$, $D_{j,down}[1 \ldots m]$, or $H_{i,up}$, $H_{j,down}$, or $H_{ms,up}$ and $H_{ms,down}$. The profile for the node i may be the input for the component 504, and the profile for the node j may be the input for the component 505. Hidden binary components 502 and 503 are provided for the respective components 504 and 505, and the component 501 is the output component acting as a T-class classifier. This modification of the structure of the Bayesian network takes into consideration the fact that the input consists of two independent vectors, being the two profiles of the two nodes i and j.

Figure 6:
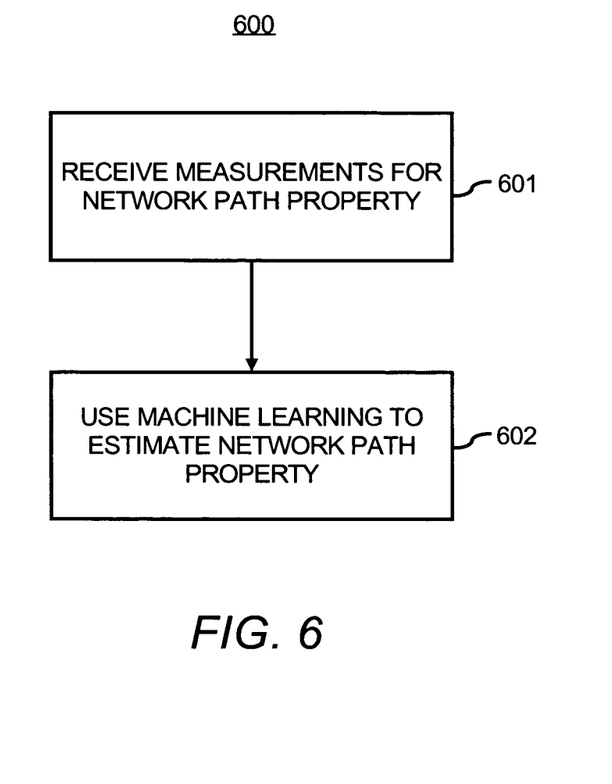
FIG. 6 illustrates a flow chart of a method for estimating a network path property, according to an embodiment.

FIG. 6 illustrates a flow chart of a method 600 for estimating a estimating a network path property. FIG. 6 is described with respect to FIGS. 1 and 2 by way of example and not limitation. The method 600 may be applied to other systems not shown.

At step 601, network path property measurements for paths between nodes and a subset of nodes in a network are received. The subset of nodes may include milestone nodes. For example, the profiler 210 shown in FIG. 2 receives measurements for the network path property. The network path property measurements may include measurements for paths including upstream and downstream routes between the nodes 140a-c shown in FIG. 1 and the landmark nodes 120a-c. Measurements may also include measurements for paths to and from intermediate routers in the upstream and downstream routes. Also, the node profiler 210 may determine node profiles for the nodes 140a-c using the measurements, such as using one of the profile functions described above.

At step 602, machine learning is used to estimate the network path property for the nodes based on the network path property measurements. For example, the prediction engine 220 uses machine learning technology to estimate the network path property for a path between the nodes. For example, node profiles are used to determine probabilities for possible estimations and one estimation is selected as the estimate of the network path property. The probability vector described above and shown as the output of the prediction engine 220 in FIG. 2 is one example of estimating the network path property using machine learning technology. A Bayesian network is one type of machine learning technology that may be used. Other conventional prediction-based, machine learning technologies may be used.

Figure 7:
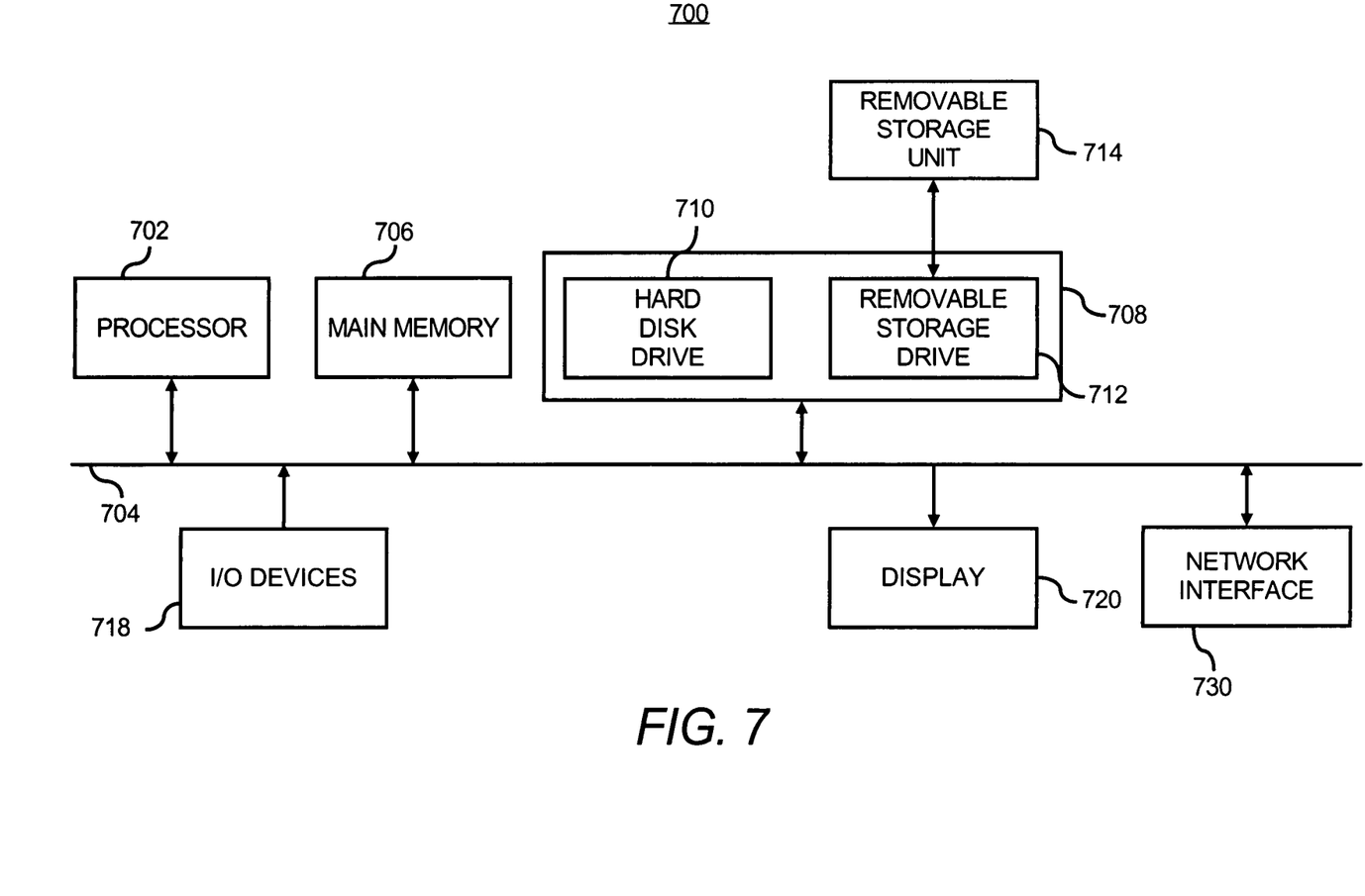
FIG. 7 illustrates a computer system, according to an embodiment.

FIG. 7 illustrates an exemplary block diagram of a computer system 700 that may be used as a node in the system 100 shown in FIG. 1. The computer system 700 includes one or more processors, such as processor 702, providing an execution platform for executing software. Commands and data from the processor 702 are communicated over a communication bus 704. The computer system 700 also includes a main memory 706, such as a Random Access Memory (RAM), where software may be executed during runtime, and a secondary memory 708. The secondary memory 708 includes, for example, a hard disk drive 710 and/or a removable storage drive 712, or a nonvolatile memory where a copy of the software may be stored. The secondary memory 708 may include ROM (read only memory), EPROM (erasable, programmable ROM), EEPROM (electrically erasable, programmable ROM).

A user interfaces with the computer system 700 with one or more input/output (I/O) devices 708, such as a keyboard, a mouse, a stylus, and the like. A display 720 may also be provided. A network interface 730 is provided for communicating with other nodes via the network.

The computer system 700 may be used as a platform for the milestone nodes 120a-c and 130a-c shown in FIG. 1 or the nodes 140a-c. The profiler 210 and the prediction engine 220 may be provided as software stored in the secondary memory 708 and stored in the main memory 706 during run time, and the computer system 700 may be used as a platform for running the profiler 210 and the prediction engine 220.

One or more of the steps of the method 600 and other steps described herein may be implemented as software embedded on a computer readable medium, such as the memory 706 and/or 708, and executed on the computer system 700. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. It is therefore to be understood that those functions enumerated above may be performed by an electronic device capable of executing the above-described functions.

While the invention has been described with reference to the exemplary embodiments thereof, those skilled in the art will be able to make various modifications to the described embodiments without departing from the scope of claims.

What is claimed is:

1. A method of estimating a network path property between two nodes in a network, the method comprising:
   receiving network path property measurements for paths between each of the two nodes and a subset of nodes in the network;
   determining, by a computer system, node profiles for the two nodes using the received network path property measurements, wherein the node profiles are used to estimate the network path property between the two nodes, and wherein determining node profiles comprises determining network path property vectors including the received network path property measurements for the two nodes, and truncating the vectors by a predetermined number of values; and
   estimating the network path property between the two nodes based on the node profiles,
   wherein the subset of nodes comprises milestone nodes, and wherein determining node profiles for the two nodes using the received network path property measurements comprises:
   determining common nodes that are common for upstream and downstream routes, wherein the upstream routes are between one of the two nodes and the milestone nodes and the downstream routes are between the milestone nodes and the other one of the two nodes;
   for every common node,
      determining a first network path property vector including measurements for one of the upstream routes between one of the two nodes and the common node; and
      determining a second network path property vector including measurements for one of the downstream routes between the other one of the two nodes and the common node.

2. The method of claim 1, wherein estimating comprises: using machine learning to determine probabilities for possible estimations of the network path property; and selecting one of the possible estimations as the estimated network path property.

3. The method of claim 1, further comprising:
   determining a count of a number of the measurements in the vectors for the nodes that are the same; and
   including the count in the node profiles.

4. The method of claim 1, further comprising:
   determining a histogram for each of the vectors, wherein the histograms are used in the node profiles.

5. The method of claim 1, wherein the subset of nodes comprises milestone nodes, and receiving network path property measurements for paths between each of the two nodes and a subset of nodes in the network comprises:
   receiving network path property measurements for paths between each of the two nodes and landmark nodes of the milestone nodes, and paths between each of the two nodes and intermediate routers of the milestone nodes.

6. The method of claim 1, wherein using machine learning to estimate the network path property between the two nodes based on the node profiles further comprises:
   using a Bayesian trained classifier to estimate the network path property.

7. The method of claim 1, wherein the network path property comprises one of hop count, latency, bandwidth and loss.

8. A method of estimating a network path property between two nodes in a network, the method comprising:
   receiving network path property measurements for paths between each of the two nodes and a subset of nodes in the network, wherein the subset of nodes comprises milestone nodes; and
   determining, by a computer system, node profiles for the two nodes using the received network path property measurements by
      determining common nodes that are common for upstream and downstream routes, wherein the upstream routes are between one of the two nodes and the milestone nodes and the downstream routes are between the milestone nodes and the other one of the two nodes;
      for every common node,
         determining a first network path property vector including measurements for one of the upstream routes between one of the two nodes and the common node;
         determining a second network path property vector including measurements for one of the downstream routes between the other one of the two nodes and the common node; and
         determining a histogram for the first and second vectors; and
   using machine learning to estimate the network path property between the two nodes based on the node profiles.

9. A machine learning prediction system having a processor operable to estimate a network path property between two nodes in a network, the system comprising:
   a profiler operable to receive network path property measurements for paths between each of the two nodes and milestone nodes in the network, and determine profiles for each of the two nodes based on the received network path property measurements, wherein the profiles are used to estimate the network path property between the two nodes and wherein the profiles are determined by determining network path property vectors including the measurements for the two nodes, and truncating the vectors by a predetermined number of values; and
   a prediction engine using machine learning technology to estimate the network path property between the two nodes based on the determined profiles, wherein the machine learning technology includes using machine learning to determine probabilities for possible estimations of the network path property; and selecting one of the possible estimations as the estimated network path property, wherein the profiler is operable to determine node profiles for the two nodes using the received network path property measurements by:

determining common nodes that are common for upstream and downstream routes, wherein the upstream routes are between one of the two nodes and the milestone nodes and the downstream routes are between the milestone nodes and the other one of the two nodes;

for every common node, determining a first network path property vector including measurements for one of the upstream routes between one of the two nodes and the common node;

determining a second network path property vector including measurements for one of the downstream routes between the other one of the two nodes and the common node; and determining a histogram for the first and second vectors.

10. The system of claim 9, wherein the network path property comprises one of hop count, latency, loss and bandwidth.

11. The system of claim 9, wherein the milestone nodes comprise landmark nodes in the network and intermediate routers in the network, wherein an intermediate router is a node encountered in an upstream route from a first node of the two nodes to a landmark node and encountered in a downstream route from a landmark node to a second node of the two nodes; and the measurements comprise measurements to the milestone nodes.

12. The system of claim 9, wherein the machine learning technology comprises a Bayesian trained classifier.

13. The system of claim 9, wherein the profiler is operable to determine a count of a number of the measurements in the vectors that are the same, and include the count in the node profiles.

14. The system of claim 11, wherein the profiler is operable to determine milestone node histograms from the vectors, wherein the milestone node histograms are used to determine the node profiles and are determined for each common milestone node in upstream routes and downstream routes for the nodes.

15. The system of claim 9, wherein the profiler is operable to determine node histograms from the vectors, wherein the node histograms are used to determine the profiles.

16. Computer software embedded on a non-transitory computer readable medium, the computer software including instructions when executed performing a method of estimating a network path property, the method comprising:

receiving network path property measurements for paths between each node of a first set of nodes and milestone nodes in a network;

determining a node profile for each node of the first set of nodes by determining network path property vectors and truncating the vectors by a predetermined number of values, wherein each node profile includes the received network path property measurements between the node and the milestone nodes; and using machine learning to estimate a network path property between two nodes in the first set, wherein the machine learning estimation of the network path property uses the node profiles for the two nodes, wherein determining a node profile for each node of the first set of nodes comprises:

determining milestone nodes that are common for upstream and downstream routes, wherein the upstream routes are between one of the two nodes and the milestone nodes and the downstream routes are between the milestone nodes and the other one of the two nodes;

for every common milestone node, determining a first network path property vector including measurements for one of the upstream routes between one of the two nodes and the common milestone node;

determining a second network path property vector including measurements for one of the downstream routes between the other one of the two nodes and the common milestone node; and determining a histogram for the first and second vectors.

17. The computer software embedded on a non-transitory computer readable medium of claim 16, wherein the method further comprises:

using the machine learning to determine probabilities for possible estimations of the network path property between the two nodes; and selecting one of the possible estimations as the estimated network path property.

* * * * *

UNITED STATES PATENT AND TRADEMARK OFFICE
CERTIFICATE OF CORRECTION

PATENT NO. : 8,660,018 B2
APPLICATION NO. : 11/496409
DATED : February 25, 2014
INVENTOR(S) : Sharma et al.

Page 1 of 1

It is certified that error appears in the above-identified patent and that said Letters Patent is hereby corrected as shown below:

In the Claims

Column 12, line 7, in Claim 16, delete "property ," and insert -- property, --, therefor.

Signed and Sealed this
Third Day of June, 2014

Michelle K. Lee
*Deputy Director of the United States Patent and Trademark Office*